United States Patent
Gibson et al.

(10) Patent No.: US 8,251,517 B2
(45) Date of Patent: Aug. 28, 2012

(54) SCANNED PROXIMITY DETECTION METHOD AND APPARATUS FOR A SCANNED IMAGE PROJECTION SYSTEM

(75) Inventors: Gregory T. Gibson, Snohomish, WA (US); Joshua M. Hudman, Sammamish, WA (US); Margaret K. Brown, Seattle, WA (US); Christian Dean DeJong, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 530 days.

(21) Appl. No.: 12/615,138

(22) Filed: Nov. 9, 2009

(65) Prior Publication Data

US 2010/0053591 A1 Mar. 4, 2010

Related U.S. Application Data

(63) Continuation-in-part of application No. 11/950,639, filed on Dec. 5, 2007, now abandoned.

(51) Int. Cl.
*G03B 21/14* (2006.01)

(52) U.S. Cl. .............................. 353/85; 353/50; 353/121

(58) Field of Classification Search .................... 353/85, 353/46, 50, 69, 70, 101, 196.1–226.3; 356/4.01, 356/4.07, 5.01, 5.04
See application file for complete search history.

(56) References Cited

U.S. PATENT DOCUMENTS

| | | | |
|---|---|---|---|
| 6,002,505 A * | 12/1999 | Kraenert et al. ........... 359/196.1 |
| 6,361,173 B1 | 3/2002 | Vlahos et al. | |
| 7,144,117 B2 * | 12/2006 | Kojima ............................ 353/37 |
| 7,325,933 B2 * | 2/2008 | Kaise et al. ...................... 353/97 |
| 7,500,756 B2 | 3/2009 | Ito | |
| 8,182,093 B2 * | 5/2012 | Kurozuka et al. ................ 353/37 |
| 2002/0021418 A1 | 2/2002 | Raskar | |
| 2003/0010888 A1 * | 1/2003 | Shimada et al. ........... 250/201.1 |
| 2003/0038928 A1 | 2/2003 | Alden | |
| 2003/0174125 A1 | 9/2003 | Torunoglu et al. | |
| 2003/0222892 A1 | 12/2003 | Diamond et al. | |
| 2004/0070563 A1 | 4/2004 | Robinson | |
| 2004/0165154 A1 * | 8/2004 | Kobori et al. ..................... 353/69 |
| 2004/0239653 A1 | 12/2004 | Stuerzlinger | |
| 2005/0046803 A1 | 3/2005 | Akutsu | |
| 2005/0117132 A1 * | 6/2005 | Agostinelli .................... 353/122 |
| 2005/0129273 A1 | 6/2005 | Pryor | |
| 2006/0101349 A1 | 5/2006 | Lieberman et al. | |
| 2006/0103811 A1 | 5/2006 | May et al. | |
| 2006/0170871 A1 * | 8/2006 | Dietz et al. ....................... 353/31 |
| 2007/0035521 A1 | 2/2007 | Jui et al. | |
| 2007/0115440 A1 | 5/2007 | Wiklof | |
| 2007/0146655 A1 | 6/2007 | Li et al. | |
| 2009/0033884 A1 * | 2/2009 | Yonekubo et al. ............... 353/85 |
| 2009/0219493 A1 * | 9/2009 | Okubo et al. ..................... 353/85 |
| 2010/0315605 A1 * | 12/2010 | Arita ................................ 353/98 |
| 2011/0199588 A1 * | 8/2011 | Kato ................................. 353/85 |

* cited by examiner

*Primary Examiner* — William C Dowling
(74) *Attorney, Agent, or Firm* — Kevin D. Wills

(57) ABSTRACT

A encoded image projection system (100) is configured to determine the proximity of the system to a projection surface (106). The encoded image projection system (100) includes a light encoder (105) that scans a non-visible light beam (115) on the projection surface (106) selectively when scanning visible light to create an image. A detector (118) is then configured to receive reflections of the non-visible light beam (115) from the projection surface (106). A control circuit (120) is configured to determine the distance (124) between the projection surface (106) and the system from, for example, intensity data or location data received from the detector (118). Where the distances (124) are below a threshold, the control circuit (120) can either reduce the output power of the system or turn the system off.

4 Claims, 8 Drawing Sheets

SCANNED PROXIMITY DETECTION METHOD AND APPARATUS FOR A SCANNED IMAGE PROJECTION SYSTEM

CROSS REFERENCE TO PRIOR APPLICATIONS

This application is a continuation-in-part of U.S. application Ser. No. 11/950,639, filed Dec. 5, 2007, which is incorporated by reference for all purposes.

BACKGROUND

Image projection technology is becoming more advanced. While projectors were once large, bulky devices, advances in technology such as the development of laser diodes have allowed designers to build image projection systems in very small form factors. Such laser-based projection devices facilitate the production of brilliant images created with vibrant colors. Further such systems can be manufactured with a size that is easily integrated into portable electronic devices such as mobile telephones, gaming devices, personal digital assistants, and portable computers. Some image projection systems, such as those employing semiconductor lasers, have even been created with a small enough form factor to fit into special types of eyeglasses or headgear. Due to the ease with which the laser light can be angularly encoded, these projection systems can project images directly into the human eye, without the need of a projection surface.

Figure 1:
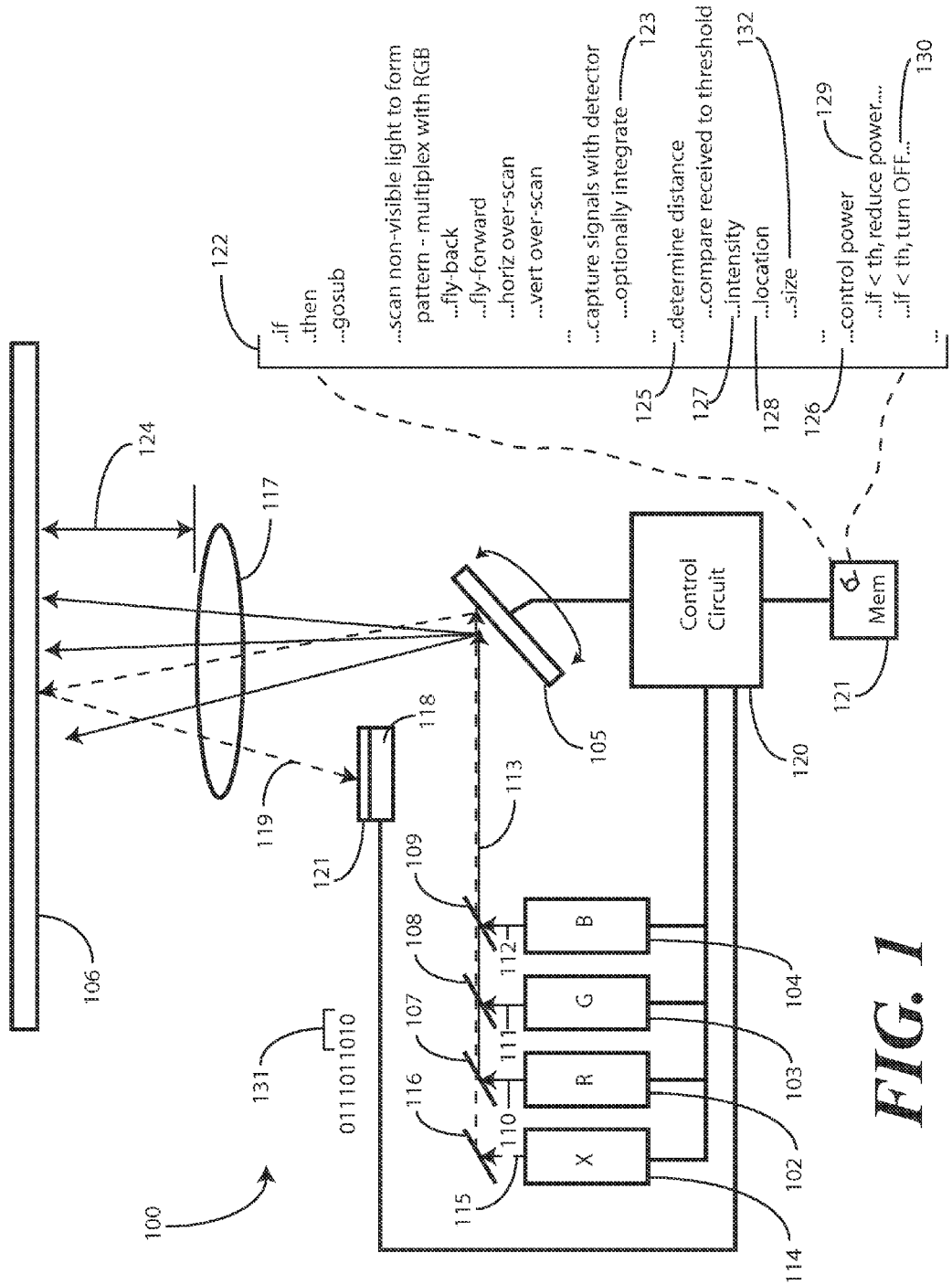
FIG. 1 illustrates one scanned image projection system configured for proximity detection, and correspondingly power management, in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to determining the proximity between an imaging system and a projection surface, and correspondingly regulating the output power of the imaging system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of proximity detection and power management as described herein. The non-processor circuits may include, but are not limited to, microprocessors, scanning mirrors, image encoding devices, memory devices, clock circuits, power circuits, and so forth. As such, these functions may be interpreted as steps of a method to perform proximity detection or power management. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide projection systems and accompanying methods for determining the proximity of a projection system with a projection surface. Where the proximity is known, the output power of the projection system can be regulated accordingly. For example, where the projection system is a scanned laser projection system in a pair of eyeglasses that is used to project images on a user's retina, the proximity detection can be used to regulate the power such that the projection system meets the requirements for Class 1 or Class 2 lasers. Where the projection system is used simply to project images on a surface such as a wall, the proximity detection described herein can be used to adjust the brightness of the projector to ensure a properly visible image at a given distance.

In one embodiment, a non-visible light source, such as an infrared light source or an ultraviolet light source, is encoded, angularly, spatially, or otherwise, along with visible light sources during the projection process. For instance, in one embodiment an infrared light source can be encoded along with a red light source, a green light source, and a blue light source. Through selective actuation of the infrared light source, non-visible patterns can be projected on a projection surface in a multiplexed fashion with the visible images.

A detector disposed in the image projection system, such as a charge-coupled device or a CMOS-photodetector, can then generate signals for a control unit as the detector receives reflections of the infrared light patterns on the projection surface. The control unit, which can be a microprocessor, programmable logic, an application specific integrated circuit, or other device, can then be programmed or otherwise configured to compare the received infrared signals with thresholds or transmitted infrared signals. For example, the control unit can be configured to compare the intensity or location of a centroid of the infrared pattern from the received infrared light with levels or locations corresponding to the transmitted infrared light to determine how far the projection surface is from the image projection system. Where this distance is within certain limits, the control unit can be configured to reduce the output power of the image projection system, or alternatively, to turn the image projection system OFF entirely.

Turning now to FIG. 1, illustrated therein is one embodiment of a encoded image projection system 100 configured for proximity detection in accordance with embodiments of the invention. FIG. 1 illustrates a general block diagram of the scanned image projection system, with one or more laser sources 101 is configured to produce a plurality of light beams. While laser sources 101 are used as an illustrative embodiment for discussion purposes, it will be clear to those of ordinary skill in the art having the benefit of this disclosure that the invention is not so limited. Other types of light sources could equally be used with the proximity detection and power management described herein.

In one embodiment, the one or more laser sources 101 comprise a red laser 102, a blue laser 103, and a green laser 104, as indicated by the "R," "G," and "B" in the illustrative embodiment of FIG. 1. Note that where lasers are used as light sources, the lasers can be any of various types of lasers. For example, in one embodiment, each laser source 101 is a semiconductor laser, as these lasers are small and efficient. Edge-emitting lasers can be used as the laser sources 101, as can vertical cavity surface emitting lasers. Such semiconductor lasers are well known in the art and are commonly available from a variety of manufacturers.

A light encoder 105 is then configured to produce images by spatially or angularly encoding the light from the laser sources along a projection surface 106. In one embodiment, the light encoder 105 comprises a Micro-Electro-Mechanical-System (MEMS) scanning mirror, such as those manufactured by Microvision, Inc. Examples of MEMS scanning mirrors, such as those suitable for use with embodiments of the present invention, are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, entitled, "Substrate-guided Display with Improved Image Quality," which is incorporated herein by reference.

While a scanning mirror is one type of light encoder suitable for use with embodiments of the invention, it will be clear to those of ordinary skill in the art having the benefit of this disclosure that the invention is not so limited. Other types of light encoders, such as a spinning wheel found digital light projection technology systems, can also be used. As will be described below, embodiments of the invention work to determine proximity by selectively encoding a non-visible beam with visible beams. Any of a number of encoders can be configured to function similarly with the scanned mirror encoder described herein.

To facilitate freedom of design within the encoded image projection system 100, i.e., to permit the designer to orient the one or more laser sources 101 in various ways relative to the light encoder 105, one or more optical alignment devices 107,108,109 may optionally be used to direct light beams 110,111,112 from the one or more laser sources 101 to the light encoder 105. For example, the one or more optical alignment devices 107,108,109, in one embodiment, are used to orient the plurality of light beams 110,111,112 into a single, collimated light beam 113. Where the one or more laser sources 101 comprise a red laser 102, blue laser 103, and green laser 104, the one or more optical alignment devices 107,108,109 can blend the output of each laser to form a collinear beam of light.

In one embodiment, dichroic mirrors are used as the one or more optical alignment devices 107,108,109. Dichroic mirrors are partially reflective mirrors that include dichroic filters that selectively pass light in a narrow wavelength bandwidth while reflecting others. In one embodiment, polarizing coatings can be incorporated into the dichroic mirrors as well. Dichroic mirrors and their use in laser-based projection systems are known in the art and, as such, will not be discussed in further detail here. Note that the location, as well as the number, of the optical alignment devices 107,108,109 can vary based upon application. For example, in some MEMS-type scanning systems, the plurality of light beams 110,111, 112 can be encoded directly into the scanning mirror. Alternatively, some applications may not require optical alignment devices 107,108,109.

To determine proximity of the encoded image projection system 100 to the projection surface 106, a non-visible light source 114 is co-located with the plurality of visible light sources 102,103,104. Note that for discussion purposes and for ease of explanation of FIG. 1, the "image creating" light sources, i.e., the red laser 102, blue laser 103, and green laser 104 of FIG. 1, are described as being visible light sources used to create an image, while the non-visible light source 114 is used to determine proximity Such a configuration is useful in that people may view a visible image without being distracted by a proximity detecting beam. However, it will be clear to those of ordinary skill in the art having the benefit of this disclosure that the invention is not so limited. For example, other applications, such as machine-based applications in factories, may use non-visible light to create images and visible light to determine proximity. A barcode reader, for instance, may create bar code reading images with infrared or ultraviolet light, while proximity detection may be performed with a visible light so as to be detectable by a person supervising the barcode reading operation.

In the illustrative embodiment of FIG. 1, the non-visible light source 114 can be, for example, an infrared light source or an ultraviolet light source. Similarly, as with the visible light sources 102,103,104, the non-visible light source 114 can be a semiconductor light source such as a light emitting diode. One example of a non-visible light source 114 is that of an infrared light emitting diode having a wavelength of around 800-810 nanometers. Another example of a non-visible light source 114 is that of an ultraviolet light emitting diode having a wavelength of around 400-410 nanometers. It will be clear to those of ordinary skill in the art having the benefit of this disclosure that the invention is not so limited, as any number of non-visible light sources can be used, depending, for example, upon the size of the encoded image projection system, the intended application, and so forth.

In one embodiment, the non-visible light source 114 is disposed within the encoded image projection system 100 such that the non-visible light beam 115 emitted therefrom is generally collinear with the visible light beams 110,111,112. For example, as shown in FIG. 1, the non-visible light source 114 can be disposed alongside the visible light sources 102, 103,104. Further, as shown in this illustrative embodiment, an additional optical alignment device 116 can be used to orient the non-visible light beam 115 so as to be collinear with the combined light beam 113.

The light encoder 105 is then able to encode the non-visible light beam 115 along with the visible light beams 110,111, 112 along the projection surface 106. The encoding can be done angularly, as shown in FIG. 1, or can be done spatially as well. As the visible light beams 110,111,112 are used to create an image on the projection surface 106, the non-visible light beam 115 can be used to project non-visible light patterns along the projection surface 106. The non-visible light patterns, which can be lines, circles, dots, triangles, and so forth, may be displayed simultaneously with the visible images. Alternatively, the non-visible light patterns can be multiplexed into the visible images. For example, where the visible images are created with light encoded in a raster pattern, the non-visible images can be projected only during certain portions of the raster pattern, such as the fly-back portion, the fly-forward portion, the vertical over-scan portion, or the horizontal over-scan portion, as will be described in more detail below. When the light encoder 105 encodes the non-visible light beam 115, it passes through the lens 117 or other output of the encoded image projection system 100 to the projection surface 106.

As the non-visible light beam 115 is encoded, the corresponding non-visible patterns can be selectively placed along the projection surface 106. For example, in one embodiment, a series of non-visible lines or circular dots can be temporarily multiplexed with the visible image by encoding the non-visible light beam 115 accordingly. In another embodiment, a plurality of non-visible circles can be created along the perimeter of the visible image. Any of a number of non-visible patterns and encoding schemes with the visible image can be used.

The non-visible light beam 115, upon being encoded along the projection surface 106, reflects from the projection surface back through the lens 117 or other image projection system interface to a detector 118 that is configured to receive the reflected beam 119 and create electrical signals corresponding to the reflected beam's intensity and location on the detector 118. In one embodiment, the detector 118 is configured as a charge coupled device photodetector. In another embodiment, the detector 118 is configured as a CMOS photodetector. Other types of non-visible light detectors may also be used.

The detector 118 effectively captures an "image" of the reflected beam 119 and delivers a corresponding signal to a control circuit 120. Reflected beams 119 may be delivered to the detector 118 by the light encoder 105 through a scanning process. Alternatively, a diffractive element disposed near the lens 117 may be used to direct light to the detector 118.

In one embodiment, to keep the signal to noise ratio high, the detector 118 is configured with a filter 121 that blocks visible light and allows the non-visible light to pass to the detector 118. For example, in one embodiment where the non-visible light source 114 comprises an infrared light source, the detector 118 can comprise an infrared input filter that blocks light in the visible spectrum but allows infrared light to pass therethrough. In another embodiment, where the non-visible light source 114 comprises an ultraviolet light source, the detector 118 can comprise an ultraviolet filter that blocks the visible spectrum while allowing ultraviolet light to pass.

When the detector 118 captures images of the encoded non-visible light patterns on the projection surface 106, the detector 118 delivers the corresponding signals to the control circuit 120. The control circuit 120, which may be a microcontroller, a microprocessor, ASIC, logic chip, or other device, serves as the brain of the encoded image projection system 100. The control circuit 120 can include other processing units dedicated to performance of specific functions. For example, an integrated or stand-alone digital signal processor may handle the processing of incoming communication signals or data. In the illustrative embodiment of FIG. 1, the control circuit 120 is shown for simplicity as an integrated circuit, but shall be understood to be representative of any processing architecture known to those skilled in the art.

The control circuit 120, which can be a single processor, such as a microprocessor integrated circuit, or alternatively may comprise one or more processing units or components, is coupled to a memory 121 or other computer readable medium. By executing operable code 122 stored in the memory 121, in one embodiment the control circuit 120 is capable of causing the various components of the encoded image projection system 100 to execute their respective functions.

In one embodiment, the control circuit 120 executes operable code 122 comprising one or more routines stored in the memory 121, which may comprise one or more memories. For example, the memory 121 may comprise a separate and distinct integrated circuit connected and operable with the control circuit 120 via a data bus. Further, the memory 121 may include one or more read-only memories, dynamic or static random-access memory, or any other type of programmable memory, such as one or more EPROMs, EEPROMs, registers, and the like. In some embodiments, the memory 121 can comprise non-traditional storage devices as well The routines stored in the memory 121 can be stored in the form of executable software, firmware, or in any other fashion known to those skilled in the art.

In addition to the executable code 122 operable with the control circuit 120, the memory 121 may further store other information. For instance, in one embodiment, the control circuit 120 can be optionally configured to integrate 123 successive images captured by the detector 118. In such an embodiment, the image data can be stored in the memory 121. The executable code stored within the memory 121 can be configured as modules. Alternatively, the various modules can be configured as logic in hardware as well.

Upon receiving the image data from the detector 118, in one embodiment the control circuit 120 is configured to determine 125 a distance 124 between the encoded image projection system 100 and the projection surface 106. Where the encoded image projection system 100 is too close to the projection surface 106, the control circuit 120 can be configured to manage 126 the output power, such as by reducing the power or turning the encoded image projection system 100 OFF, accordingly. Such a feature can be advantageous in that it can permit the encoded image projection system 100 to remain within Class 1 and Class 2 requirements while still being capable of presenting bright, vivid images at distances beyond certain thresholds.

In one embodiment, the control circuit 120 is configured to determine 125 the distance 124 by comparing an intensity 127 of the reflected beam 119, a location 128 of the reflected beam 119, a size 132 of the reflected beam 119, or combinations thereof, with a standard, which may correspond to the non-visible light beam 115 that was transmitted. For example, by simply comparing the intensity in one embodiment, the control circuit 120 can be configured to determine an approximate distance by determining the amount of non-visible light 115 that has been lost in the reflected beam 119. Alternatively, by determining the location 128 of the reflected beam 119, the control circuit 120 can be configured to determine an approximate distance as well, as the angle of transmission of the non-visible light beam 115 is known due to the fact that the angle of the light encoder 105 is known when the non-visible light source 114 is active.

Figure 6:
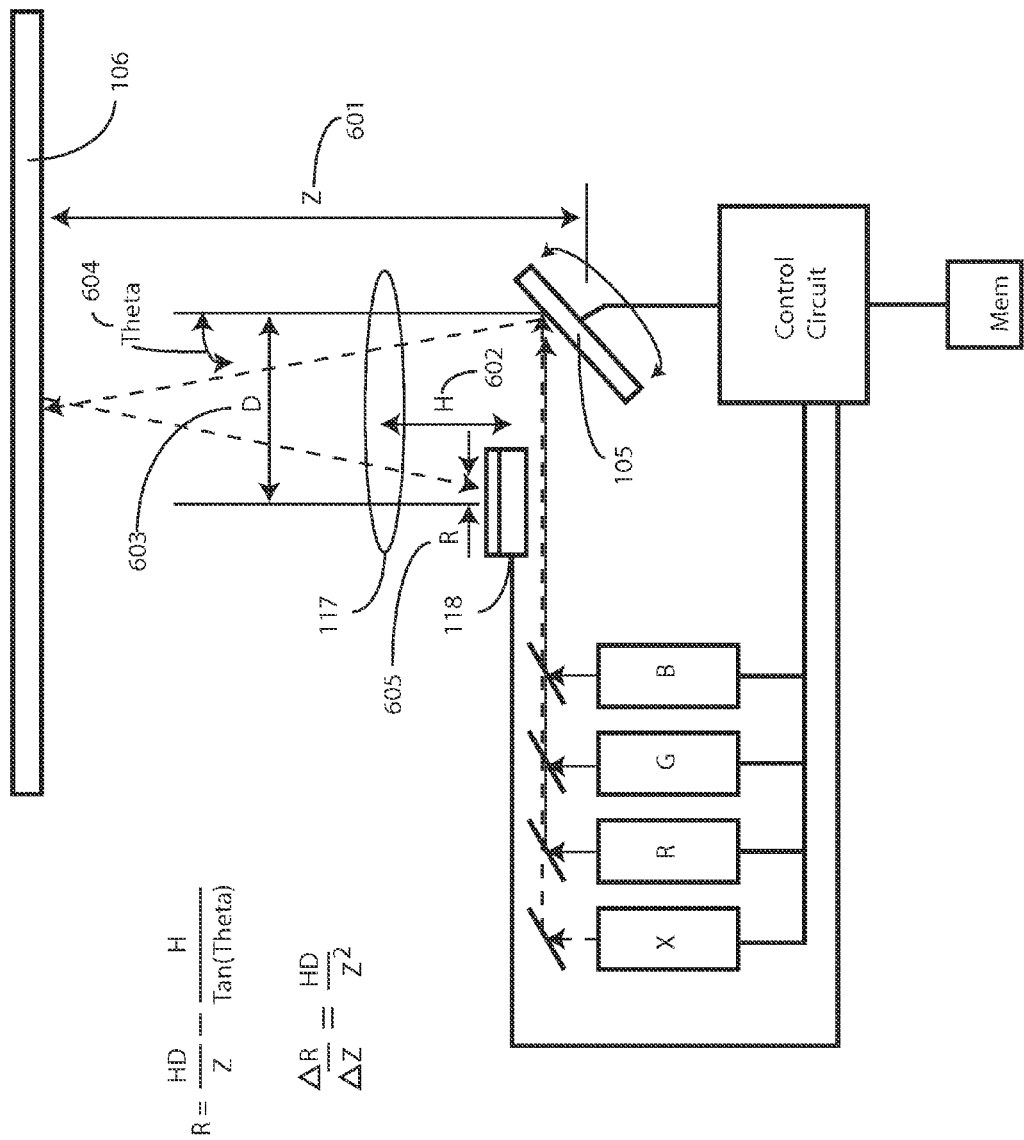
FIG. 6 illustrates one set of geometric relationships that may be used to determine proximity in accordance with embodiments of the invention.

Using location 128 as an illustrative example, a location threshold can be a calibrated reference point ($R_{Z,100\,mm}$) when the encoded image projection source 100 is one hundred millimeters away from the projection surface 106. The control circuit 120 can then be configured to determine the distance 124 using the equations that follow. Note that the generic form of these equations is shown in FIG. 6, with like reference designators flowing from FIG. 1. Referring to both figures, the equations for determining proximity using a 100 millimeter reference point can be written as follows:

$$Z = (H*D)/(R - H*\tan(theta)); \quad [EQ.\ 1]$$

$$\text{delta } R = R_{Z,100\,mm} = H*D/100 - H*D/Z; \text{ and therefore} \quad [EQ.\ 2]$$

$$Z = 100*H*D/(H*D - 100*\text{delta } R) \quad [EQ.\ 3]$$

In EQS. 1, 2 and 3, Z 601 is the distance from the light encoder 105 to the projection surface 106, H 602 is the distance from the lens 117 to the detector 118, D 603 is the distance between the light encoder 105 center and the lens 117 center, theta 604 is an angle of the beam transmitted from the encoded image projection system 100, and R 605 is the radial distance from the center of the lens 117 to the centroid of the image on the detector 118. This particular method is merely one enablement, as others will be obvious to those of ordinary skill in the art having the benefit of this disclosure.

Turning now back to FIG. 1, in one embodiment, where shapes are used as non-visible patterns on the projection surface 106, the control circuit 120 is configured to compute the centroid of each shape when determining the intensity 127 or location 128 of the reflected beam 119. As is known in the art, the centroid is the geometric center of such an object, and is formed by the intersection of all straight lines that divide the object into two parts of equal moments about the line. Generally speaking, it is approximated as the average of all the points within a shape. In two dimensions, the centroid approximates the center of mass the shape. By first determining the centroid, the control circuit 120 can ensure that a center region of the shape is being used for increased resolution of either intensity 127 or location 128 of the reflected beam 119. In one embodiment, the centroid can be determined as a cumulative sum of the product of location and intensity. Note that where intensity is used as a determinant of proximity, intensity can optionally be correlated with other proximity measurements initially, such as those by location. This correlation can then be used to generate an estimate of the reflectivity for a particular object. If the correlation corresponding to a particular area of the object exhibits no discontinuity in distance (for example by examining the rate of change of proximity), then the intensity threshold can be adjusted based on the estimated reflectivity, thereby improving the fidelity.

Once the intensity 127 or location 128 is known, it can be compared to a predetermined threshold stored in the memory 121. The predetermined threshold can correspond to the amount of energy delivered by the encoded non-visible light beam 115. Alternatively, it can be a threshold that is calibrated for a particular encoded image projection system 100 in the factory.

The control circuit 120 can then be configured to control 126 the power based upon this comparison. For example, where the distance 124 is below the predetermined threshold, the control circuit 120 may be configured to reduce the output power of the encoded image projection system 100. Such may be the case where the encoded image projection system 100 is a Class 1 or Class 2 system, and the designer wishes to ensure that maximum power output thresholds are not breached. Illustrating by way of example, it is possible to accommodate the encoded image projection system 100 into eyewear. In such an embodiment, where the distance 124 is less than a predetermined number of millimeters, such as where the encoded image projection system 100 is configured to project images into the user's retina, the control circuit may be configured to reduce 129 the output power so as to be under a predetermined limit, such as those set forth by the Class 1 and Class 2 safety standards.

A more common example may be the case in which the encoded image projection system 100 is configured to project images at a predetermined distance, such as 500 millimeters. Where an object, such as a user's hand, came into the field of view at less than a predetermined distance from the system, the system may be configured to reduce its output power. For example, if the user's hand was within 100 millimeters of the encoded image projection system 100, the control circuit 120 may be configured to cause the encoded image projection system 100 to reduce power or, alternatively, cease projecting images on the projection surface 106.

One advantage that the encoded proximity detection techniques of embodiments of the present invention offer over prior art inventions is that the detector 118 can capture images at a very fast frequency. For example, in one embodiment, as many as 100 frames per second, or more, can be captured by the detector 118. Where the non-visible pattern is a single dashed line, using the over-scan portion of a raster pattern delivered by the encoded image projection system 100, the non-visible data may be captured at a rate on the order of 20 kHz. With these increased frequencies, the control circuit 120 can be configured to determine relatively accurate approximations of distance using less than the full number of bits delivered by the detector 118. Simulation testing has shown that acceptable results can be obtained when three or fewer least significant bits 131 of intensity or location data are used by the control circuit 120. In some embodiments, as few as one or two bits can be used.

Note that while the embodiment of FIG. 1 includes both the non-visible light source 114 in the same device as the visible light sources 102,103,104, with a single encoder 105 being used to scan each, it will be clear to those of ordinary skill in the art having the benefit of this disclosure that the invention is not so limited. Other configurations can be manufactured as well. By way of one example, turning now briefly to FIG. 8, a two-device configuration 800 is shown.

Figure 8:
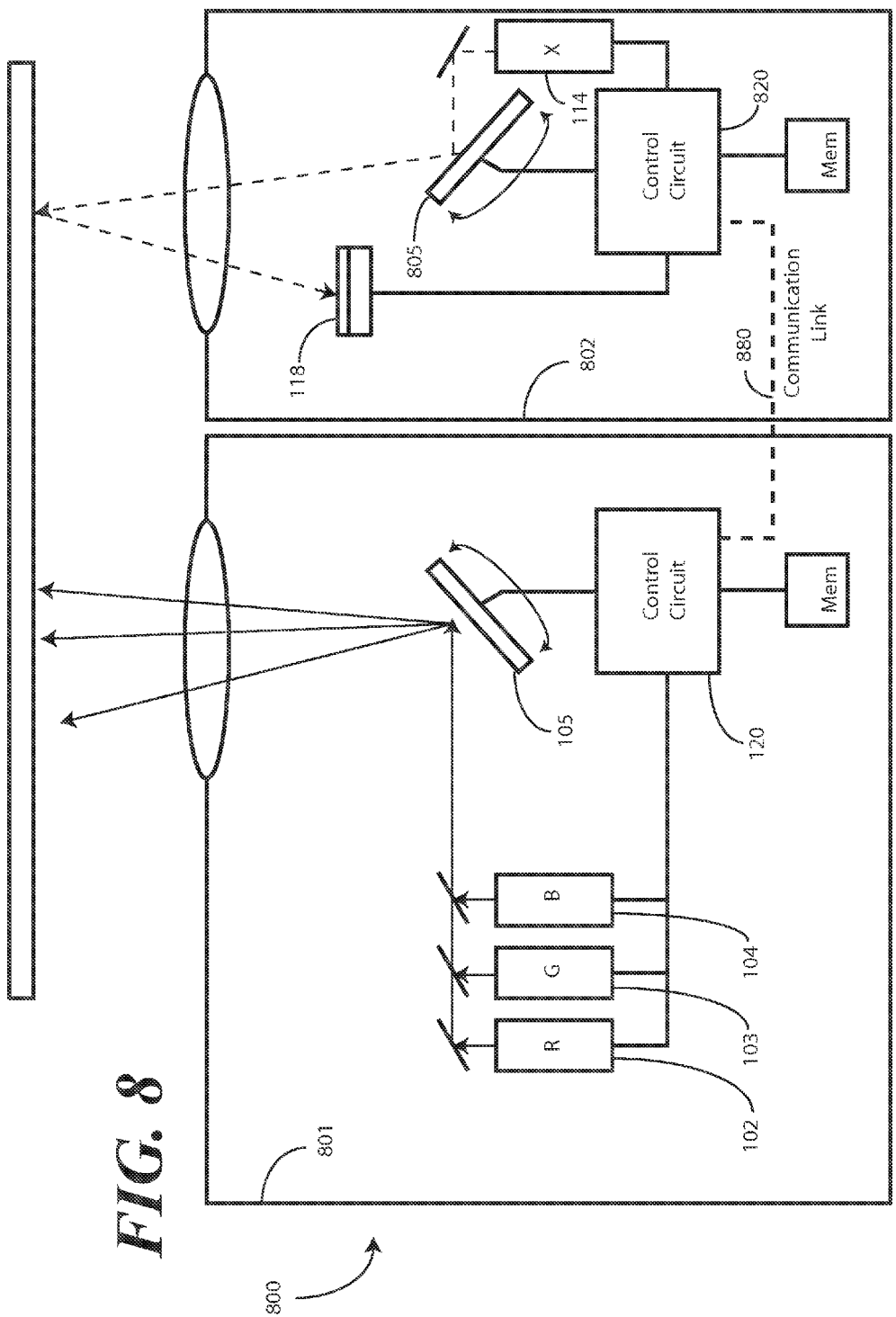
FIG. 8 illustrates another scanned image projection system configured for proximity detection, and correspondingly power management, in accordance with embodiments of the invention.

In FIG. 8, a first device 801 serves as the image projection source, with a second device 802 serving as the proximity detector. The visible light sources 102,103,104 and their corresponding light encoder 105 are located in the first device 801, while the non-visible light source 114 and its corresponding encoder 805 are disposed in the second device 802. Note that while the beams from the first device 801 and second device 802 are shown in the illustration as being separated from each other, they need not be. The non-visible beams can overlap, intersect, or be separate from the visible beams as described above. FIG. 8 is not necessarily drawn to scale so that the internal components of each device may more clearly be seen. Also note that while the second device 802 is shown as including its own lens, the inclusion of a lens is not a requirement for operation.

In the illustrative embodiment of FIG. 8 a first control circuit 120 is used to control the visible light sources 102, 103, 104, and a second control circuit 820 is used to control the non-visible light source 114 and detector 118. A communication link 880 syncs the two processors where required, such as when it is desired to actuate the non-visible light source 114 only when the visible light sources 102,103,104 are in active. While two control circuits 120,820 are shown, note that a single control circuit can be used for both devices 801,802, with the single control circuit providing control signals to the other device through the communication link 880.

Figure 2:
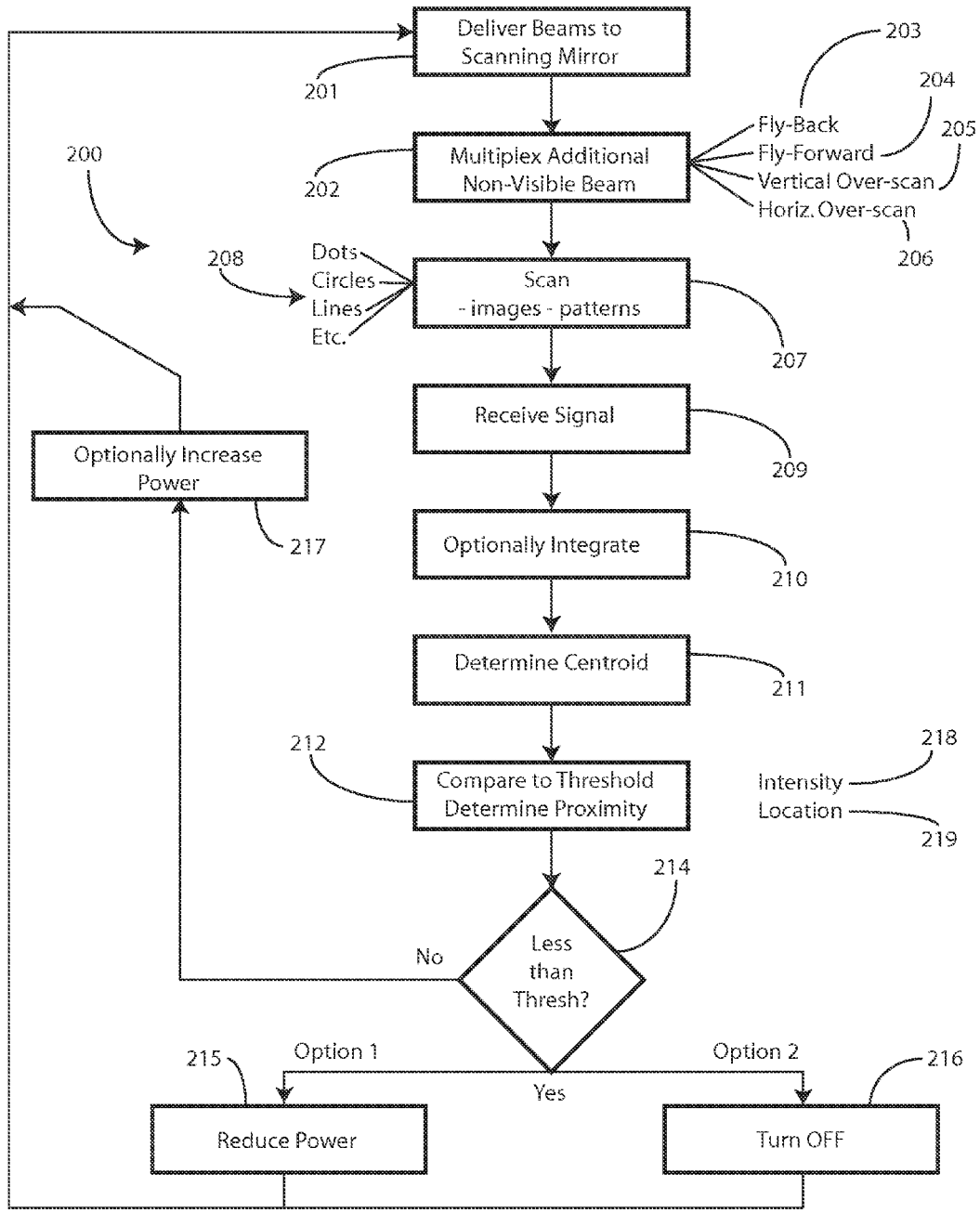
FIG. 2 illustrates one method of determining a distance between a scanned projection system and a projection surface for power management in accordance with embodiments of the invention.

Turning now to FIG. 2, illustrated therein is a method 200 for determining a distance between a encoded projection system and a projection surface in accordance with embodiments of the invention. The method 200 is suitable for coding as executable code for a processor, such as the control circuit (120) of FIG. 1. The method 200 can be embodied, for example, in computer-readable media such as computer storage media and communication media. The method 200 may be configured as computer-readable instructions, data structures, program modules or other data.

At step 201, light is delivered to a light encoder. In accordance with one embodiment, the light includes visible light for projecting images on a projection surface. At step 202, a non-visible light beam is also delivered to a light encoder. The non-visible light beam and visible light may optionally be oriented into a collinear beam, perhaps by one or more optical alignment devices, at this step as well.

In one embodiment, the non-visible light is multiplexed with the visible light for power regulation. For example, where both visible light sources and non-visible light sources are simultaneously active, the overall output power of the image projection system will increase due to the addition of the non-visible beam. However, the non-visible beam does not increase the overall visibility of the resulting image. Thus, to use more output energy for creating visible images, in one embodiment the non-visible light source will be active when the visible sources are either inactive or are not being actively encoded by the light encoder. Where the light encoder is creating images by scanning a raster pattern along the projection surface, some suitable times include the fly-back portion 203 of this scan or the fly-forward portion 204 of the scan. Other suitable times include during vertical over-scan portions 205 or horizontal over-scan portions 206, where over-scanning is employed to further enhance the resolution of the projected image.

At step 207, the light encoder scans a visible image on the projection surface, and selectively scans non-visible patterns 208 with the non-visible light. As noted above, these patterns 208 can take any of a variety of shapes, including lines, dashes, dots, circles, triangles, rectangles, and so forth.

In one embodiment, these patterns are projected on particular regions of interest within or near an image. For example, the pattern may be swept across an image at various times to determine the three dimensional shape of the projection surface. A first pattern may be projected, for instance, in the upper left-hand corner, while a second pattern may be projected in the lower right-hand corner, and so forth. Additionally, the region of interest may change as the distance is determined For example, where it appears that the projection surface is close to the image projection system, the region of interest may become larger, and when the projection surface appears to be farther from the image projection system, the region of interest may become smaller.

At step 209, a reflected, non-visible light beam is received from the projection surface in response to the selective scanning of the patterns 208 that occurred at step 207. This reflected beam can then be converted to electrical signals that indicate a location and intensity of the received beam. At optional step 210, successive images of the received beam can be integrated to smooth the data. In one embodiment, only certain least significant bits will be integrated, such as one, two, or three least significant bits. The application and the frequency of sampling the received beam may work to determine how many bits are used.

At optional step 211, a centroid of the pattern 208 of the non-visible light is determined As noted above, in one embodiment this is done by integrating a cumulative sum of the product of location and intensity of the reflected beam as determined by a detector or other device.

At step 212, the distance between the image projection system and the projection surface is approximated by comparing the location 219, intensity 218, size, or combinations thereof with a predetermined threshold. For example, where the centroid is determined at optional step 211, the location of the centroid can be compared to calibrated positions that are functions of the distance from a projection surface. These calibrated positions can be stored in a look-up table in memory. Location is a suitable threshold for such an embodiment. Distance between the image projection system and the projection surface can be determined quickly and accurately by comparing the location of the reflected beam on a detector and comparing it with calibrated location positions stored in memory.

Note that in addition to making a comparison with a threshold, it is also possible at step 212 to compare the location 219, intensity 218, size, or combinations thereof, to previous data as well. Comparisons with both a threshold and previous data can also be made. The utilization of previously acquired data offers the system the ability to determine not only proximity, but a change in proximity, such as whether the projection surface has moved closer, farther, or has stayed in substantially the same position. The change in proximity can then be used to "tune" or "trim" the method 200 to anticipate a future location of the projection surface or a future threshold crossing.

At decision 214, the method 200 determines whether the detected distance is above or below a predetermined threshold. For an image projection system suitable for projecting images directly into the eye, examples of such thresholds may include 25 millimeters, 50 millimeters, 75 millimeters, 100 millimeters, and so forth. Where the distance is below a particular threshold, the method 200 may elect to control the power as set forth in optional steps 215 and 216. For example, in one embodiment, where the distance is less than the threshold, the method 200 may decrease the overall output power of the image projection system as set forth at step 215. In an alternative embodiment, the method 200 may turn the image projection system OFF, as indicated at step 216, when the distance is below a particular threshold.

In some embodiments, it may be desirable to keep the output power of the image projection system as close to the maximum acceptable limit as possible in an attempt to generate bright, vivid images. In such an embodiment, where the distance is not beneath the threshold as determined at decision 214, the method 200 may optionally increase the output power at step 218.

Figure 7:
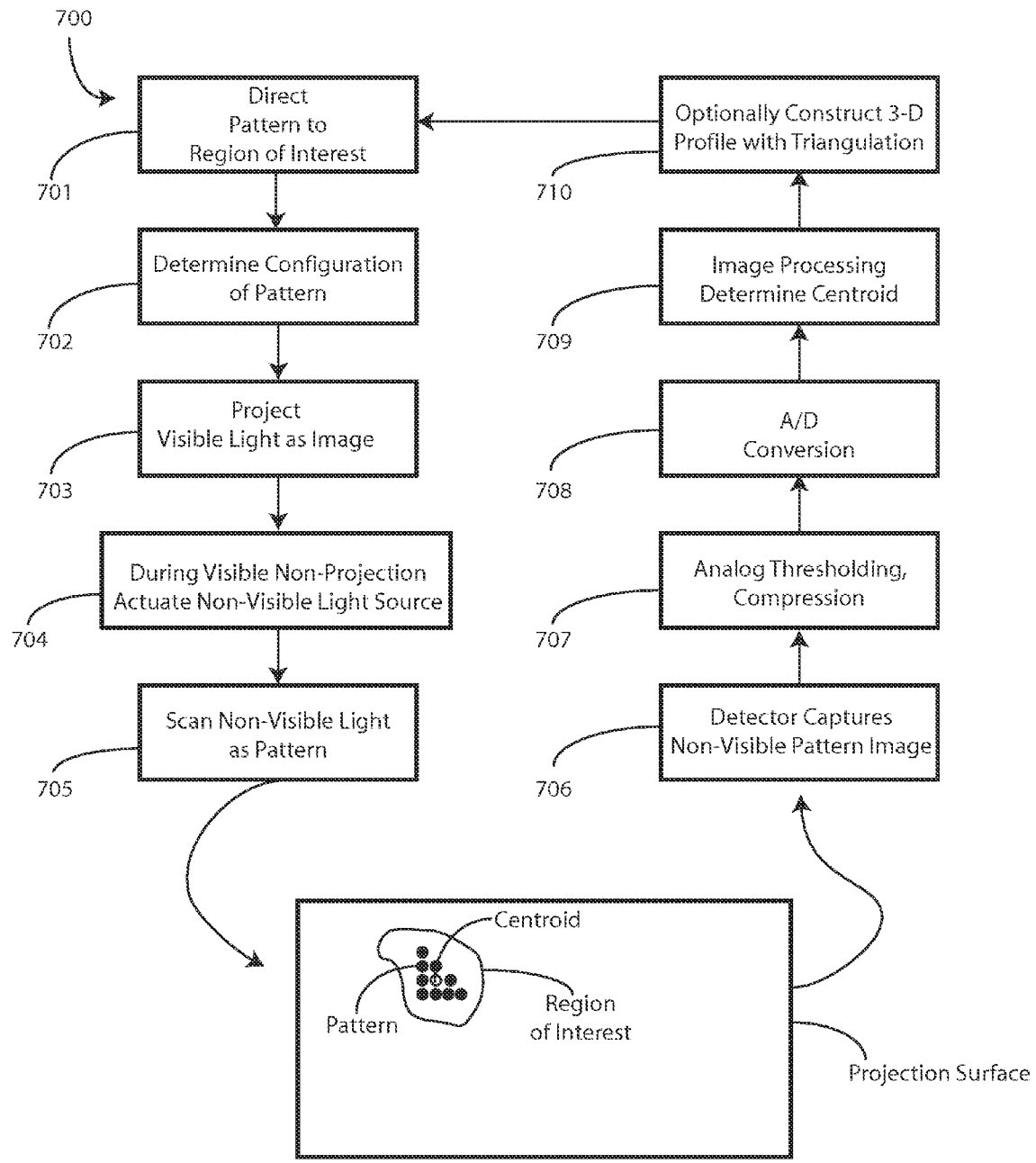
FIG. 7 illustrates an operational diagram in accordance with one embodiment of the invention.

Turning briefly to FIG. 7, illustrated therein is one version of this method (200) shown, for illustration, as an operational block diagram 700. The operational block diagram 700 includes various actions that may occur in a sequential loop. Note that while the elements of method (200) are included, the ordering is altered somewhat in the operational block diagram 700. Further, some additional processing steps are shown as well.

Beginning at operation 701, a region of interest is determined so that the non-visible pattern that will be used to determine proximity can be directed thereto. In some applications or environments, the entire projection surface will be a region of interest. In other applications or environments, only a portion of the projection surface will be used as a region of interest. Consider, for example, the situation where a user's hand is placed between the image projection source and the projection surface such that a portion of the image is projected on the user's hand. As some safety guidelines concern themselves with power delivered to the closest projection source, the control circuit may determine that the region of interest to consider is the closer surface, which in this example is the user's hand. As the projection surface is secondary in importance, the region of interest may exclude areas of the projection surface upon which the image is projected.

At operation 702, a particular pattern is determined As mentioned above, the pattern can include various shapes, lines, dots, and so forth. Some applications will be more disposed to certain patterns, as will be apparent to those of ordinary skill in the art having the benefit of this disclosure. At operation 703, the image is created with the projection of visible light as described above.

At operation 704, the non-visible light source is actuated. As noted above, this can occur when the visible light sources are inactive, such as during the fly-back portion of a raster scan. The non-visible light is scanned as the pattern at operation 705.

At operation 706, the detector captures an image of the non-visible pattern. Threshold determinations are then made at operation 707. Further, as may be necessary, the data associated with the image captured at operation 706 may be processed at operation 707. For example, the data can be compressed, or data outside of the region of interest may be excluded.

At operation 708, the analog data can be converted to digital form for more efficient use by the control circuit. From this digital data, the control circuit may determine the centroid, as mentioned above, at operation 709. Where desired, the centroids of multiple patterns can be used to form a three-dimensional model of the projection surface. For example, in one embodiment triangulation can be used to form a three-dimensional model of the projection surface based upon the various distances measured at this step. As needed, the operation can repeat.

Figure 3:
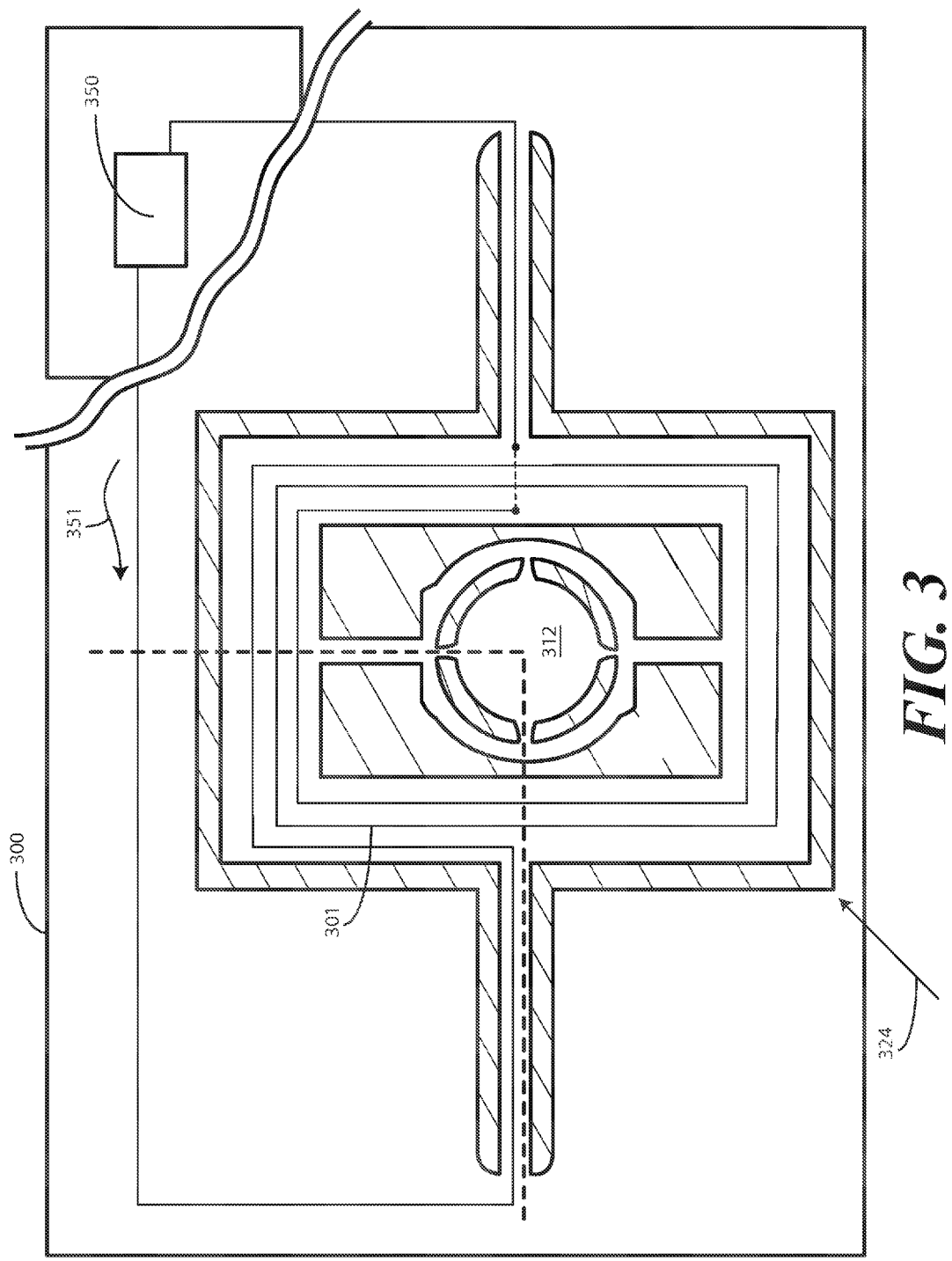
FIG. 3 illustrates one embodiment of a light encoder suitable for use with embodiments of the invention.

Turning now to FIG. 3, illustrated therein is one example of a light encoder 300 suitable for scanning the visible and non-visible light in accordance with embodiments of the invention. The illustrative light encoder 300 of FIG. 3 is that of a MEMS scanning platform such as that described in commonly assigned U.S. patent application Ser. No. 12/496, 892 to Brown et al., entitled, "Phase Locked Resonant Scanning Display Projection," which is incorporated herein by reference. Note that there are many different ways in which a light encoder 300 can be constructed, and the MEMS scanning platform is but one example that is used for discussion purposes only.

The principal scanning component of the light encoder 300 is a scanning mirror 312. In the illustrative embodiment of FIG. 3, a driver 350, which may be integrated with the control circuit (120) of FIG. 1, delivers a drive signal 351 to a drive coil 301 disposed about the scanning mirror 312. The drive signal 351 causes a corresponding current to pass through the windings of the drive coil 301. An external magnetic field source disposed near the light encoder (not shown) imposes a static magnetic field on the coil 301. The magnetic field a component 324 in the plane of the coil, and is oriented non-orthogonally with respect to the two drive axes. The in-plane current in the windings of the coil 301 interacts with the in-plane magnetic field component 324 to produce out-of-plane Lorentz forces on the conductors of the coil 301. As the drive current forms a loop, the current reverses sign across the scan axes, which causes the Lorentz forces to also reverse sign across the scan axes, thereby causing the application of mechanical torque. This combined torque produces responses in the two scan directions, depending on the frequency content of the torque, thereby causing motion about the axes. This motion permits the driver 350, or the control circuit (120) to scan the visible light as an image on a projection surface. Further, by selectively actuating the non-visible light source, the motion permits the non-visible patterns for proximity detection to be scanned as well. In one embodiment for example, the drive signal 351 causes the scanning mirror 312 to sweep back and forth in a raster pattern at the frame rate of incoming video.

Figure 4:
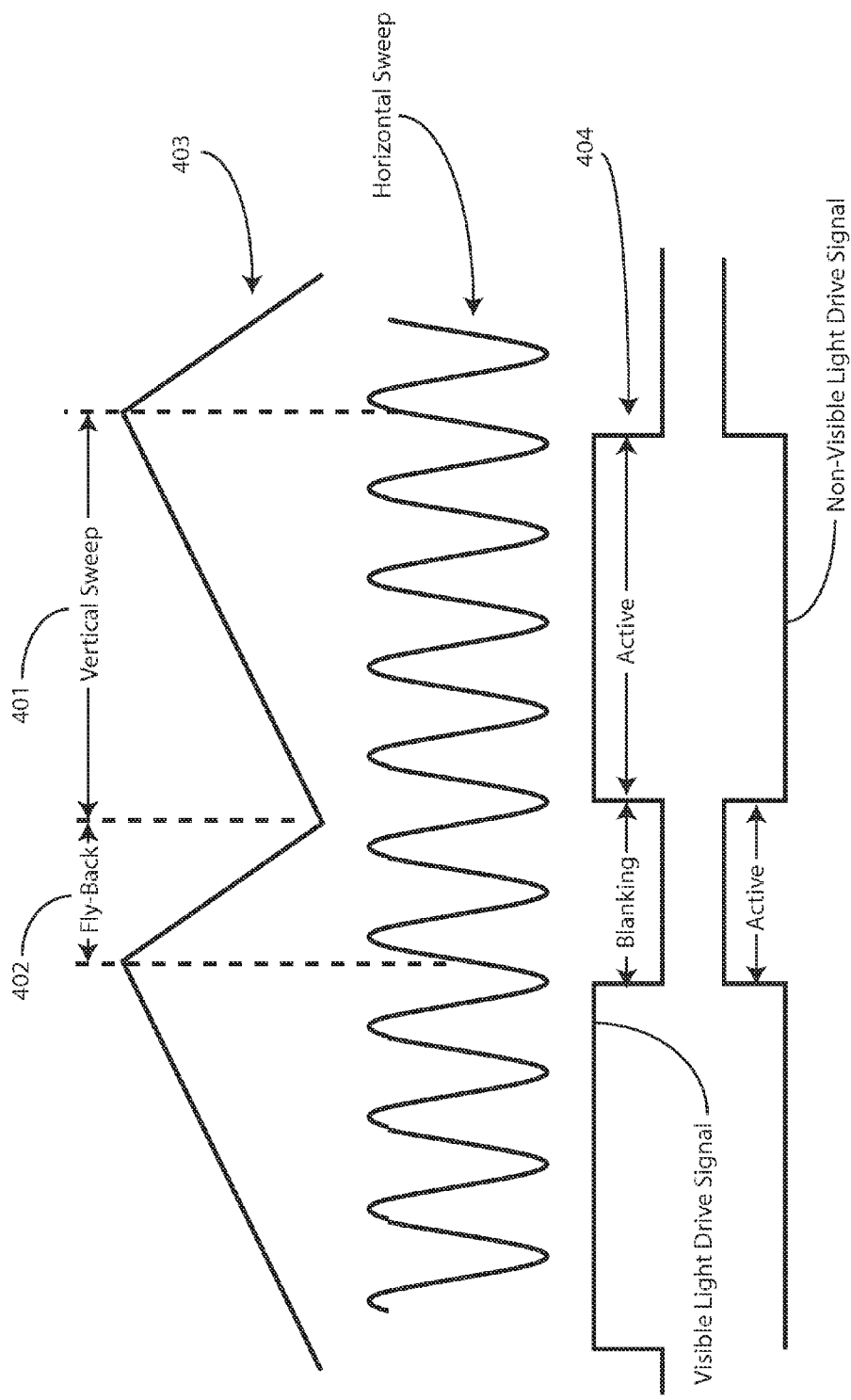
FIG. 4 illustrates an exemplary raster waveform to illustrate one possible timing sequence for implementing proximity detection in accordance with embodiments of the invention.

Turning now to FIG. 4, illustrated therein is an exemplary drive signal 315 suitable for creating images with a raster scan pattern. While a raster scan is but one method of generating an image on a projection surface, it is a commonly used one and is therefore discussed as one embodiment illustrating where selective scanning of the non-visible light used for proximity detection can occur.

When using a raster scan pattern, a point of illumination (such as the combined light beam (113 of FIG. 1) is scanned in two dimensions to form a rasterized image. Typically, one scan axis (fast-scan axis) is scanned at an integer multiple of the other axis (slow-scan axis). Both axes can be scanned, for instance with the light encoder (300) of FIG. 3, with a unidirectional ramp or sawtooth function having a portion 401 where the visible light sources are active. During this portion 401, the light encoder (300) scans the point of illumination to construct the image. In this particular embodiment, a "fly-back" portion 402 then exists where the visible light sources are not active. However, in one embodiment, the non-visible light source (114) can be activated during this fly-back portion 402 such that the light encoder (300) may create the non-visible patterns suitable for determining proximity. Note that where this is the case, the slow-axis sweep 403 may not be a straight line as shown in FIG. 4, but may rather be a complex line corresponding to the desired region of interest or pattern being scanned. Plot 404 illustrates a possible activation timing diagram for the visible and non-visible light sources.

Note that while fly-back is one suitable opportunity for activating the non-visible light source and scanning the non-visible patterns, it is not the only opportunity. As noted above, others include during a fly-forward portion, during a vertical over-scan portion, and during a horizontal over-scan portion. Further, the non-visible light source may be activated simultaneously with the visible light sources as well. The concepts of fly-forward, vertical over-scan, and horizontal over-scan are known to those of ordinary skill in the art to which the invention pertains, and will not be discussed in further detail here, both in the interest of brevity and in light of the fly-back example given in FIG. 4.

Figure 5:
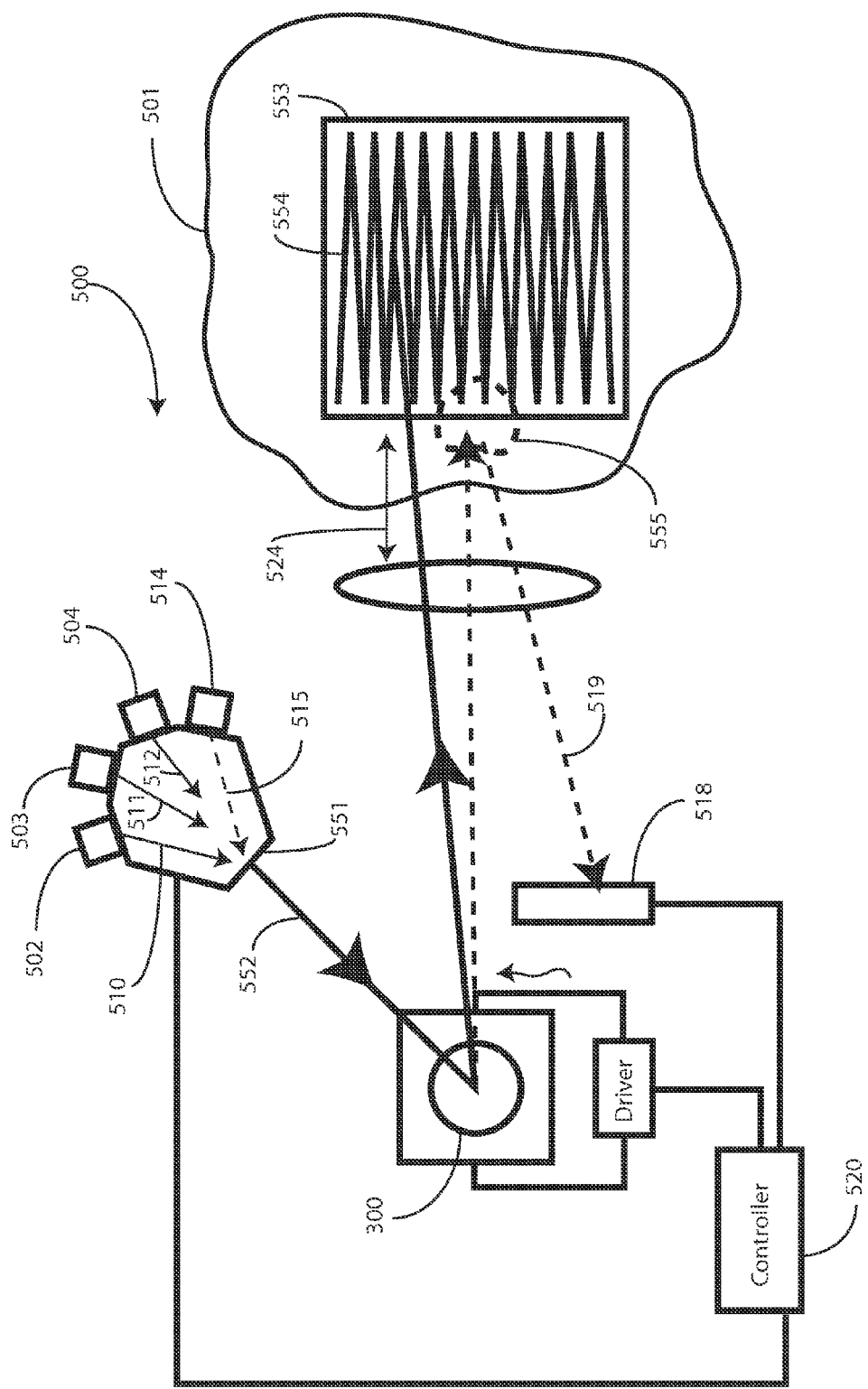
FIG. 5 illustrates one image system capable of determining a distance between the imaging system and a projection surface, and correspondingly regulating the power, in accordance with embodiments of the invention.

Turning now to FIG. 5, illustrated therein is an imaging system 500 capable of determining a distance between the imaging system 500 and a projection surface 501 in accordance with embodiments of the invention. The illustrative embodiment of FIG. 5 shows the light encoder 300 of FIG. 3 as an illustrative example.

As shown in FIG. 5, the imaging system 500 includes one or more light sources, which in this illustrative embodiment include a red light source 502, a green light source 503, and a blue light source 504 that are configured to selectively produce one or more light beams 510,511,512. An additional light source, which in this embodiment is a non-visible light source 514, is configured to selectively produce an alternate, non-visible light beam 515. The non-visible light source 514, as noted above, may be an ultraviolet or infrared light source. A beam combiner 551 combines the output of the light sources 502,503,504,514 to produce a combined beam 552. An optional collimation or focusing optical element may be included between the light sources 502,503,504,514 and the light encoder 300.

As described above, the light encoder 300 is configured to produce images 553 by scanning the collinear combined beam 552 along the projection surface 501. In this illustrative embodiment, the light encoder 300 is operative as an electromechanically controllable scanning assembly that is responsive to a controller 520. The light encoder 300 receives the combined beam 552 and deflects in response to a drive signal from the controller. This pivoting action scans the combined beam 552 horizontally and vertically, and in one embodiment, in a raster pattern 554. The imaging system 500 thus forms an image 553.

The light encoder 300 also generates non-visible patterns 555 on the projection surface 501. In one embodiment, these patterns 555 are multiplexed with the visible images such that the actuation of the non-visible light source 514 does not increase the instantaneous output power of the imaging system 500 while creating images. As described above, the controller 520 can be configured to generate the patterns 555 during one of a fly-back portion of the raster pattern 554, a fly-forward portion of the raster pattern 554, or during horizontal or vertical over-scan portions of the raster pattern 554. As also set forth above, the patterns 555 can take various shapes and can include multiple simultaneous shapes, sequential shapes, and so forth.

A photodetector 518 is then configured to detect reflected light 519 from the alternate light beam 514 as it reflects from the projection surface 501. The photodetector 518 converts this received light into analog or digital signals indicative of, for example, location and intensity. The signals are then delivered to the controller 520. In one embodiment, the photodetector 518 includes a filter to keep the signal to noise ratio within a predetermined limit. For example, where infrared light is used for proximity detection, the photodetector 518 may include an integrated infrared filter to ensure that images captured by the photodetector 518 are only those created by the infrared light. Similarly, where ultraviolet light is used for proximity detection, the photodetector 518 may include an integrated ultraviolet light filter that allows only ultraviolet light to pass.

The controller 520 is configured to determine the distance 524 between the projection surface 501 and the imaging system 500 from at least location data generated by the photodetector 518 in response to detecting the reflected light 519 as described above. Where the distance is below a predetermined threshold, the controller 520 can reduce the power of the light sources 502,503,504,514, or may turn them OFF altogether.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of determining a distance between a encoded projection system and a projection surface, the method comprising:
   delivering one or more light beams to a encoding device;
   delivering a non-visible light beam to the encoding device with the one or more light beams;
   scanning, with the encoding device, an image on the projection surface with the one or more light beams and scanning, selectively, a pattern with the non-visible light beam;
   receiving a reflected non-visible light beam from the projection surface in response to scanning the pattern;
   determining the distance by comparing the non-visible light beam to a threshold;
   determining a rate of change in proximity by comparing the non-visible light beam to data corresponding to a previously captured non-visible light beam; and
   determining an estimated reflectivity of at least a portion of the projection surface and adjusting the threshold based upon the estimated reflectivity.

2. A method of determining a distance between a encoded projection system and a projection surface, the method comprising:
   delivering one or more light beams to a encoding device;
   delivering a non-visible light beam to the encoding device with the one or more light beams;
   scanning, with the encoding device, an image on the projection surface with the one or more light beams and scanning, selectively, a pattern with the non-visible light beam;
   receiving a reflected non-visible light beam from the projection surface in response to scanning the pattern;
   determining the distance by comparing the non-visible light beam to a threshold, wherein the determining the distance comprises determining a centroid of at least a portion of the pattern, wherein the determining the distance further comprises comparing the centroid to a location threshold value stored in a memory of the encoded projection system.

3. The method of claim 2, further comprising one of reducing an output power of the encoded projection system or turning the encoded projection system OFF when the distance is less than a location threshold.

4. A method of determining a distance between a encoded projection system and a projection surface, the method comprising:
- delivering one or more light beams to a encoding device;
- delivering a non-visible light beam to the encoding device with the one or more light beams;
- scanning, with the encoding device, an image on the projection surface with the one or more light beams and scanning, selectively, a pattern with the non-visible light beam;
- receiving a reflected non-visible light beam from the projection surface in response to scanning the pattern; and
- determining the distance by comparing the non-visible light beam to a threshold, wherein the scanning the pattern of the non-visible light beam comprises scanning the pattern within a region of interest within the image, wherein the region of interest is larger when the projection surface is closer to the encoded projection system than when the projection surface is farther from the encoded projection system.

* * * * *